(12) United States Patent
Roberts

(10) Patent No.: US 6,192,465 B1
(45) Date of Patent: Feb. 20, 2001

(54) USING MULTIPLE DECODERS AND A REORDER QUEUE TO DECODE INSTRUCTIONS OUT OF ORDER

(75) Inventor: James S. Roberts, Austin, TX (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 09/157,626

(22) Filed: Sep. 21, 1998

(51) Int. Cl.[7] .................................................. G06F 15/00
(52) U.S. Cl. ............................................ 712/212; 712/216
(58) Field of Search ..................................... 712/205, 206, 712/212, 216, 207, 210, 214, 215

(56) References Cited

U.S. PATENT DOCUMENTS

| | | | |
|---|---|---|---|
| 4,890,218 | * | 12/1989 | Bram .................................... 712/210 |
| 5,148,528 | * | 9/1992 | Fite et al. ............................. 712/210 |
| 5,371,864 | * | 12/1994 | Chuang ................................. 712/206 |
| 5,410,659 | * | 4/1995 | Goto ..................................... 712/212 |
| 5,774,737 | * | 6/1998 | Nakano ................................. 712/24 |
| 5,778,246 | * | 7/1998 | Brennan ................................ 712/23 |
| 5,809,272 | * | 9/1998 | Thusoo et al. ........................ 712/210 |
| 5,809,276 | * | 9/1998 | Deosaran et al. .................... 712/217 |
| 5,819,057 | * | 10/1998 | Witt et al. ............................. 712/204 |
| 5,892,936 | * | 4/1999 | Tran et al. ............................ 712/216 |
| 5,930,490 | * | 7/1999 | Bartkowiak .......................... 712/203 |
| 5,933,618 | * | 8/1999 | Tran et al. ............................ 712/212 |
| 5,941,980 | * | 8/1999 | Shang et al. .......................... 712/204 |

* cited by examiner

*Primary Examiner*—Meng-Ai T. An
*Assistant Examiner*—Stacy Whitmore
(74) *Attorney, Agent, or Firm*—Conley Rose & Tayon, P.C.; Dan R. Christen

(57) ABSTRACT

A microprocessor capable of out-of-order instruction decoding and in-order dependency checking is disclosed. The microprocessor may include an instruction cache, two decode units, a reorder queue, and dependency checking logic. The instruction cache is configured to output cache line portions to the decode units. The decode units operate independently and in parallel. One of the decode units may be a split decoder that receives all instruction bytes from instructions that extend across cache line portion boundaries. The split decode unit may be configured to reassemble the instruction bytes into instructions. These instructions are then decoded by the split decode unit. A reorder queue may be used to store the decoded instructions according to their relative cache line positions. The decoded instructions are read out of the reorder queue in program order, thereby enabling the dependency checking logic to perform dependency checking in program order.

25 Claims, 7 Drawing Sheets

USING MULTIPLE DECODERS AND A REORDER QUEUE TO DECODE INSTRUCTIONS OUT OF ORDER

CROSS REFERENCE TO RELATED APPLICATIONS

The following applications are related to this application: "Compressing Variable-Length Instruction Prefix Bytes", U.S. patent application Ser. No 09/158,440, filed on Sep. 21, 1998; "Method for Calculating Indirect Branch Targets", U.S. patent application Ser. No 09/157,721, filed on Sep. 21, 1998; "Using Three-Dimensional Storage to Make Variable-Length Instructions Appear Uniform in Two Dimensions"; U.S. patent application Ser. No 09/150,310; filed on Sep. 9, 1998; and "Expanding Instructions with Variable-Length Operands to a Fixed Length", U.S. patent application Ser. No. 09/165,968, filed on Oct. 2, 1998.

BACKGROUND OF THE INVENTION

1. Field of the Invention

This invention relates to decoding instructions out of program order within a microprocessor.

2. Description of the Relevant Art

Superscalar microprocessors achieve high performance through the use of pipelining, parallel execution, and high clock rates. Pipelining is an implementation technique whereby multiple instructions are overlapped during the execution process. Parallel execution refers to the simultaneously executing multiple instructions in a single clock cycle. As used herein, the term "clock cycle" refers to an interval of time during which the pipeline stages of a microprocessor perform their intended functions. At the end of a clock cycle, the resulting values are moved to the next pipeline stage.

Pipelining has several hazards associated with it. One particular hazard is stalling the pipeline due to branch instructions. When a branch instruction propagates through the pipeline, it is difficult to determine which instructions after the branch should be processed until the results of the branch instruction are know. For example, if the branch instruction is "taken", then the next instruction to be executed after the branch may be located at a particular address that is offset from the branch instruction's address. In contrast, if the branch instruction is "not taken", then the next instruction to be executed may be located at the address immediately following the branch instruction. As a result, the initial stages of the pipeline may be unable to determine which instructions should begin execution in the pipeline following the branch instruction. Thus, the pipeline may stall awaiting the results of the branch instruction.

In order to prevent the instruction pipeline from stalling, microprocessor designers may implement branch prediction schemes to provide the initial pipeline stages with a predicted result for each branch instruction. The initial stages of the pipeline speculatively execute instructions along the predicted path until the branch instruction executes and one of the following occurs: (1) the prediction is found to correct, in which case the instructions continue to execute and are no longer speculative, or (2) the prediction is found to be incorrect, in which case all pipeline stages executing instructions after the branch are flushed and the pipeline starts anew using the correct path.

While parallel execution and branch prediction improve overall instruction throughput for a microprocessor at a given clock cycle, process improvements have led to dramatically increased operating frequencies that have further increased the number of instructions that a microprocessor may execute in a fixed period of time. These advancements have placed increasing importance upon a microprocessor's ability to decode instructions. Instruction decoding typically refers to identifying the different fields within the instruction (e.g., the opcode field and any prefixes or operands) and then expanding the instruction into an internal format so that the microprocessor's functional units may easily execute the instruction.

While RISC (Reduced Instruction Set Computer) microprocessors have been implemented to simplify instruction decoding, microprocessors capable of executing older variable-length instruction sets such as the x86 instruction set have remained commercially important due to the vast amount of software available for the older instruction sets. Furthermore, operating frequencies have climbed so quickly that even RISC microprocessors may eventually need faster methods for decoding instructions.

One proposed method for quickly decoding large numbers of instructions involves using a number of parallel decoders. However, current implementations using parallel decoders have been limited in their throughput because of the "in-order" (i.e., in program order) nature of decoding. Most programs rely upon their instructions being executed in a particular order. This order is referred to as "program order". As previously noted, most modern microprocessors support out-of-order execution. However, these microprocessors must ensure that the instructions that are executed out-of-order do not aversely affect the intended operation of the program. This is accomplished through "dependency checking". Dependency checking refers to determining which instructions rely upon other instructions' prior execution to finction properly. Thus, dependency checking ensures that the only instructions that are executed out of order are those that will not adversely affect the desired operation of the program. For typical dependency checking hardware to operate correctly, it relies upon receiving decoded instructions that are in-order. Thus, typical instruction decoders receive and decode instructions in program order so that the program order will be preserved for the dependency checking hardware (typically the next stage in the instruction processing pipeline).

This in-order configuration affects decoder throughput by causing some decoders to stall in certain instances. For example, when a new set of instruction bytes is received by the decoders, each decoder must wait to output its results (i.e., its decoded instructions) until all decoders before it have output their results. If not, the following pipeline stages may receive the decoded instructions out-of-order.

For these reasons, a method and apparatus for quickly decoding a large number of instructions is desirable. In particular, a method capable of quickly decoding large numbers of instructions out of order is desirable.

SUMMARY OF THE INVENTION

The problems outlined above are in large part solved by a microprocessor capable of decoding instructions out-of-order while still performing dependency checking in program order. Broadly speaking, in one embodiment the microprocessor comprises an instruction cache, two decode units, a reorder queue, and dependency checking logic. The instruction cache may be configured to output sequential groups of instruction bytes called cache lines. The cache line is divided into portions, which are routed to respective decode units, which decode the individual instructions contained therein. The decode units operate independently of each other and may decode the cache line portions out of program order. The decode units output the decoded instructions according to their relative position within the cache line portions. The decoded instructions are received by the reorder queue, which comprises a plurality of storage lines. Each storage line in turn comprises a fixed number of instruction storage locations. The number of storage locations may equal the maximum possible number of instructions within each cache line portion. The reorder queue allocates one storage line for each decoded cache line, and the decoded instructions are stored according to their relative cache line portion positions. The decoded instructions may be read out of the reorder queue in program order, thereby enabling the dependency checking logic to perform dependency checking in program order.

In another embodiment, the microprocessor may further comprise a third decoder and routing logic. The routing logic may be configured to receive cache lines as they are output from the instruction cache and then route portions of them to one of the three decoders. The third decoder may be configured to operate as a split instruction decoder, and the routing logic may be configured to route instructions that extend across cache line portion boundaries to the third decoder.

A method for decoding instructions out-of-order and then reordering them for dependency checking is also disclosed. In one embodiment, the method may comprise fetching a plurality of instruction bytes and then decoding the instructions contained within the plurality of instruction bytes out of program order. The decoded instructions are then reordered to match program order and dependency checking is performed. The instructions may then be issued to reservation stations for eventual out of order execution.

In another embodiment, the method may further comprise allocating a first line of a reorder queue for potential instructions within the first half of the plurality of instruction bytes. A second line is allocated for storage locations within the for potential instructions within the second half of the plurality of instruction bytes. The first and second halves of the plurality of instructions are decoded independently, and the resulting decoded instructions are stored in a reorder queue. The instructions are read out of the reorder queue in program order, thereby allowing dependency checking to be performed in order.

A computer system capable of out-of-order instruction decoding is also contemplated. In one embodiment, the computer system may comprise one or two microprocessors are described above. In the case of two microprocessors they may be coupled to each other via a CPU bus. External devices, e.g., a modem, may also be coupled to the CPU bus via a bus bridge.

BRIEF DESCRIPTION OF THE DRAWINGS

Other objects and advantages of the invention will become apparent upon reading the following detailed description and upon reference to the accompanying drawings in which.

Figure 1:
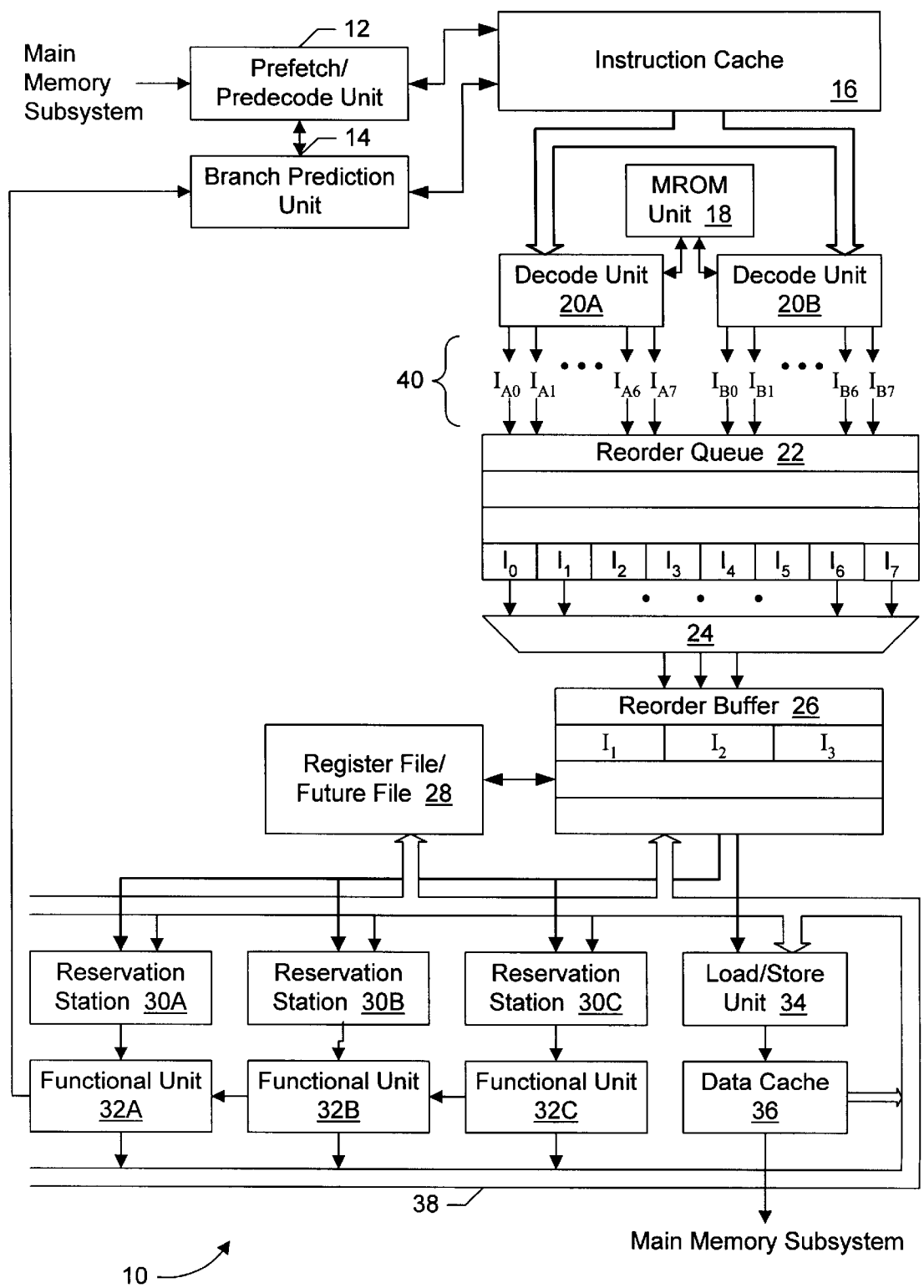
FIG. 1 is a block diagram of one embodiment of a microprocessor that is configured to decode instructions out of order.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Turning now to FIG. 1, a block diagram of one embodiment of a microprocessor 10 that is configured to decode instructions out of order is shown. In this embodiment, microprocessor 10 includes a prefetch/predecode unit 12 and a branch prediction unit 14 coupled to an instruction cache 16. Decode units 20A–B are coupled between instruction cache 16 and a reorder queue 22. A microcode read-only memory (MROM) unit 18 is also coupled to each decode unit 20A–B. Reorder queue 22 is coupled to a reorder buffer 26 by a multiplexer 24. Reorder buffer 26 is coupled to a register/future file 28, a number of reservations stations 30A–C, and a load/store unit 34. Reservations stations 30A–C are coupled to a corresponding number of functional units 32A–C, and load/store unit 34 is coupled to a data cache 36. Finally, a result bus 38 couples functional units 32A–C and data cache 36 to reorder buffer 26, register/future file 28, load/store unit 34, and reservations stations 30A–C.

Generally speaking, instruction cache 16 is a high speed cache memory provided to temporarily store instructions prior to their dispatch to decode units 20A–B. In one embodiment, instruction cache 16 is configured to cache up to 32 kilobytes of instruction code organized in cache lines of 16 bytes each (where each byte consists of 8 bits). During operation, instruction bytes are provided to instruction cache 16 by prefetching bytes from a main memory (not shown) through prefetch/predecode unit 12. It is noted that instruction cache 16 could be implemented in a set-associative, fully-associative, or direct-mapped configuration.

Prefetch/predecode unit 12 prefetches instruction code from the main memory for storage within instruction cache 16. In one embodiment, prefetch/predecode unit 12 is configured to burst 64-bit wide code from the main memory into instruction cache 16. It is understood that a variety of specific code prefetching techniques and algorithms may be employed by prefetch/predecode unit 12.

In one embodiment, as prefetch/predecode unit 12 fetches instructions from the main memory, it generates the following three predecode bits for each instruction byte: a start bit, an end bit, and a functional bit. Asserted start bits mark the first byte of each instruction. Asserted end bits mark the last byte of each instruction. Asserted functional bits mark the opcode bytes of each instruction. The predecode bits form tags indicative of the boundaries of each instruction. The predecode tags may also convey additional information such as whether a given instruction may be decoded directly by decode units 20A–B or whether the instruction is to be executed by invoking a microcode procedure stored within MROM unit 18, as described in further detail below. The predecode tags may be stored along with the instruction bytes in instruction cache 16.

In one embodiment, when instruction cache 16 receives a fetch address, it outputs a 16-byte cache line to decode units 20A–B. Decode unit 20A receives the first eight instruction bytes and decodes them into instructions. Since the x86 instruction set has instructions varying in length from one byte to sixteen bytes, an eight byte sequence of instruction bytes may have up to eight instructions encoded within it. Thus, as shown in the figure, decode unit 20A may output up to eight decoded instructions. Similarly, decode unit 20B, which is configured to receive the second eight instruction bytes and decode them, may also output up to eight decoded instructions. Decode units 20A–B operate independently of each other. For example, if decode unit 20B completes decoding a set of eight instruction bytes before decode unit 20A completes decoding its set of eight instruction bytes, then decode unit 20B may accept a new set of eight instruction bytes from instruction cache 16. Decode unit 20B may begin decoding these instructions while decode unit 20A is still busy decoding its initial set of eight instruction bytes.

To improve the flow of data from instruction cache 16 to decode units 20A–B, each decode unit may have a FIFO (first-in first-out) memory buffer at its input to receive and store the eight byte sequences until the respective decode unit is ready to begin decoding them. For example, each decode unit may have a 24-byte FIFO configured to store three 8-byte sequences. Note that decode units 20A–B are drawn as single boxes for exemplary purposes only. Each decode unit 20A–B may in fact comprises a number of individual decoders each configured to decode a single instruction. Furthermore, in some embodiments decode units 20A–B may be configured to use a variable number of clock cycles to decode each 8-byte block of instructions, depending upon the complexity of the instructions contained therein. Note that 16-byte cache lines and 8-byte sequences are used for exemplary purposes only and that other configurations are possible and contemplated (e.g., 32-byte cache lines, with four independent decoders each receiving 8-byte sequences).

Advantageously, by configuring decode units 20A–B to decode independently and out-of-order, the chance of either decode unit 20A–B stalling while waiting for the other to complete its decoding may be reduced. Furthermore, an out-of-order decoding structure may allow multiple decoders (e.g., two or more) to be more effectively utilized.

However, while out-of-order decoding may improve the performance of decode units 20A–B, decoding instructions out of order may cause difficulties further down the instruction processing pipeline when dependency checking is performed. Because most programs rely upon instructions executing in a particular order (i.e., "program order"), dependency checking is typically performed to determine which instructions may execute in an out-or-order fashion. Out-of-order execution may be used in conjunction with speculative execution of instructions to increase overall instruction throughout and performance.

In the embodiment illustrated in the figure, microprocessor 10 is configured to decode instructions out-of-order and then reorder them to allow in-order dependency checking.

Reorder queue 22 is configured to perform this reordering. In one embodiment, reorder queue 22 comprises a plurality of storage lines, wherein each storage line comprises a fixed number of individual storage locations. Each storage location is configured to store a single decoded instruction. Accordingly, the size of each storage location will vary according to the particular implementation. For example, decoders 20A–B may decode instructions to a fixed 16-byte width. The number of storage locations within each line equals the maximum possible number of instructions in each instruction byte sequence decoded by one of decode units 20A–B. In the embodiment illustrated in FIG. 1, each line has eight storage locations. In addition to the eight storage locations, each line may further comprise additional storage locations for storing address information associated with the stored instructions.

Each clock cycle, multiplexer 24 is configured to select the oldest three instructions within reorder queue 22 for dispatch to reorder buffer 26. The instructions are dispatched in program order, thereby allowing reorder buffer to perform dependency checking in-order. Multiplexer 24 is configured to ignore empty storage locations within each line of instructions. Empty storage locations may occur when the number of instructions within a decoded instruction sequence is less than the maximum possible number of instructions. Furthermore, multiplexer 24 may be configured to select instructions from more than one line in a particular clock cycle. For example, assuming a particular line is only storing two instructions, multiplexer may be configured to read an additional instruction from the following line in order to provide reorder buffer 26 with three instruction during that clock cycle. As previously noted, in one embodiment instructions are read and conveyed in program order to reorder buffer 26.

Once an instruction is read from a storage location within reorder queue 22, the storage location may be cleared or marked as empty, e.g., by setting or clearing a corresponding status bit. In one embodiment, once all storage locations within a particular line are empty, reorder queue 22 may be configured to shift the contents of each following line to fill in the empty line. In other embodiments reorder queue 22 may be configured as a line-oriented FIFO or a line-oriented circular buffer.

In the embodiment shown, reorder buffer 26 receives three decoded and reordered instructions from multiplexer 24 each clock cycle. The instructions are stored in the order that they are received. The lines each have room for three instructions. Each pending instruction is allocated a "reorder buffer tag" that identifies it as it proceeds throughout the execution pipeline. In one embodiment, the tag identifies which line within reorder buffer 26 the instruction is stored in. The tag may further include offset information to identify whether the instruction is the first, second, or third instruction within the line. Note, in other embodiments reorder buffer 26 may be configured with a different number of instructions per line, e.g., four instructions.

Reorder buffer 26 operates to keep track of the original program sequence for register read and write operations, implements register renaming, allows for speculative instruction execution and branch misprediction recovery, and facilitates precise exceptions. Reorder buffer 26 performs dependency checking to determine when an instruction may be "issued". Reorder buffer 26 issues instructions by conveying them to reservation stations 30A–C or load/store unit 34. Each reservation station acts as a buffer for the corresponding functional unit, storing instructions until they are executed. In one embodiment, reservations stations 30A–C monitor result bus 38 for results that are referenced as operands by stored instructions. If such a result is detected, the reservation station may forward the result to the corresponding pending instruction. Similarly, data from load instructions executed by load/store unit 34 may also be monitored and forwarded. The issued instructions then wait in reservation stations 30A–C or load/store unit 34 until the following criteria are met: (1) they have received all necessary operands and data, and (2) the corresponding functional unit's first execution pipeline stage is available to accept a new instruction. At that point, the instructions may enter functional units 32A–C for execution. As long as their are no dependencies, reorder buffer 26 allows instructions to issue and execute out-of-order. Advantageously, out-of-order execution in combination with speculative execution tends to increase performance by preventing functional units 32A–C from stalling. In the embodiment illustrated, instructions may be speculatively executed based upon branch prediction information stored in branch prediction unit 14.

In one embodiment, each functional unit 30A–C is configured to perform integer arithmetic operations of addition and subtraction, as well as shifts, rotates, logical operations, and branch operations. It is noted that a floating point unit (not shown) may also be employed to accommodate floating point operations.

Results produced by functional units 30A–C are sent to reorder buffer 26 if a register value is being updated, and to the load/store unit 34 if the contents of a memory location is changed. As stated previously, results are also broadcast to reservation station units 26 where pending instructions may be waiting to receive their operand values from the results of previous instruction executions.

Register/future file 28 comprises two sets of registers. One set comprises the x86 architectural registers, including eight 32-bit real registers (i.e., typically referred to as EAX, EBX, ECX, EDX, EBP, ESI, EDI and ESP). The second set comprises registers for storing the most recent speculative set of values for each architectural register. This "future file" of registers provides a convenient place from which to forward speculative register values to pending instructions. If following decode of an instruction it is determined that reorder buffer 26 has a previous location or locations assigned to a register used as an operand in the instruction, then reorder buffer 26 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 26 rather than from register file 28. If there is no location reserved for a required register in reorder buffer 26, the value is taken directly from register file 28. If the operand corresponds to a memory location, the operand value is provided to the reservation station unit through load/store unit 22.

The results of each executed instruction are stored in reorder buffer 26 until the instruction is "retired". Retiring an instruction refers to copying the instruction's results to architectural register file 28 and thereby updating the microprocessor's non-speculative architectural state. As previously noted, reorder buffer tags follow each instruction through reservation stations 30A–C and functional units 32A–C. Thus, the results may be identified and attributed to the appropriate instruction within reorder buffer 26. Once the results are received, reorder buffer 26 retires instruction in-order in a line-by-line fashion, waiting to retire a line of instructions until the following conditions are met: (1) the line is the oldest line of instructions stored within reorder buffer 26, and (2) each instruction in the line has completed execution without an exception or branch misprediction. Note that other variations of reorder buffer 26 are also possible. For example, in another embodiment reorder buffer 26 may individually retire instructions as opposed to retiring them in a line-by-line manner. Reorder buffer 26 may be implemented in a first-in-first-out configuration wherein speculative results move to the "bottom" of the buffer as they are validated and written to register file 28, thus making room for new entries at the "top" of the buffer.

More details regarding suitable reorder buffer implementations may be found within the publication "Superscalar Microprocessor Design" by Mike Johnson, Prentice-Hall, Englewood Cliffs, N.J., 1991, which is incorporated herein by reference in its entirety.

In the event of a branch misprediction, reorder buffer 26, reservation stations 30A–C, and load/store unit 34 may be configured to flush all pending instructions occurring after the misprediction branch instruction in program order. Furthermore, the contents of the architectural register file within register/future file 28 are copied to the future file to replace any erroneous values created by the execution of instructions along the mispredicted branch path. Branch mispredictions may be detected by functional units 32A–B, which forward the results of branch instructions to branch prediction unit 14.

Generally speaking, load/store unit 34 provides an interface between functional units 32A–C and data cache 36. In one embodiment, load/store unit 34 is configured with a load/store buffer that has eight storage locations for storing data and address information from pending loads or stores. Load/store unit 34 also performs dependency checking for load instructions against pending store instructions to ensure that data coherency is maintained. Data cache 36 is a high speed cache memory provided to temporarily store data being transferred between load/store unit 34 and the main memory subsystem. In one embodiment, data cache 36 has a capacity of storing up to 32 kilobytes of data. It is understood that data cache 36 may be implemented in a variety of sizes and specific memory configurations, including set associative, fully associative, and direct mapped configurations.

Out of Order Decoding

Figure 2A:
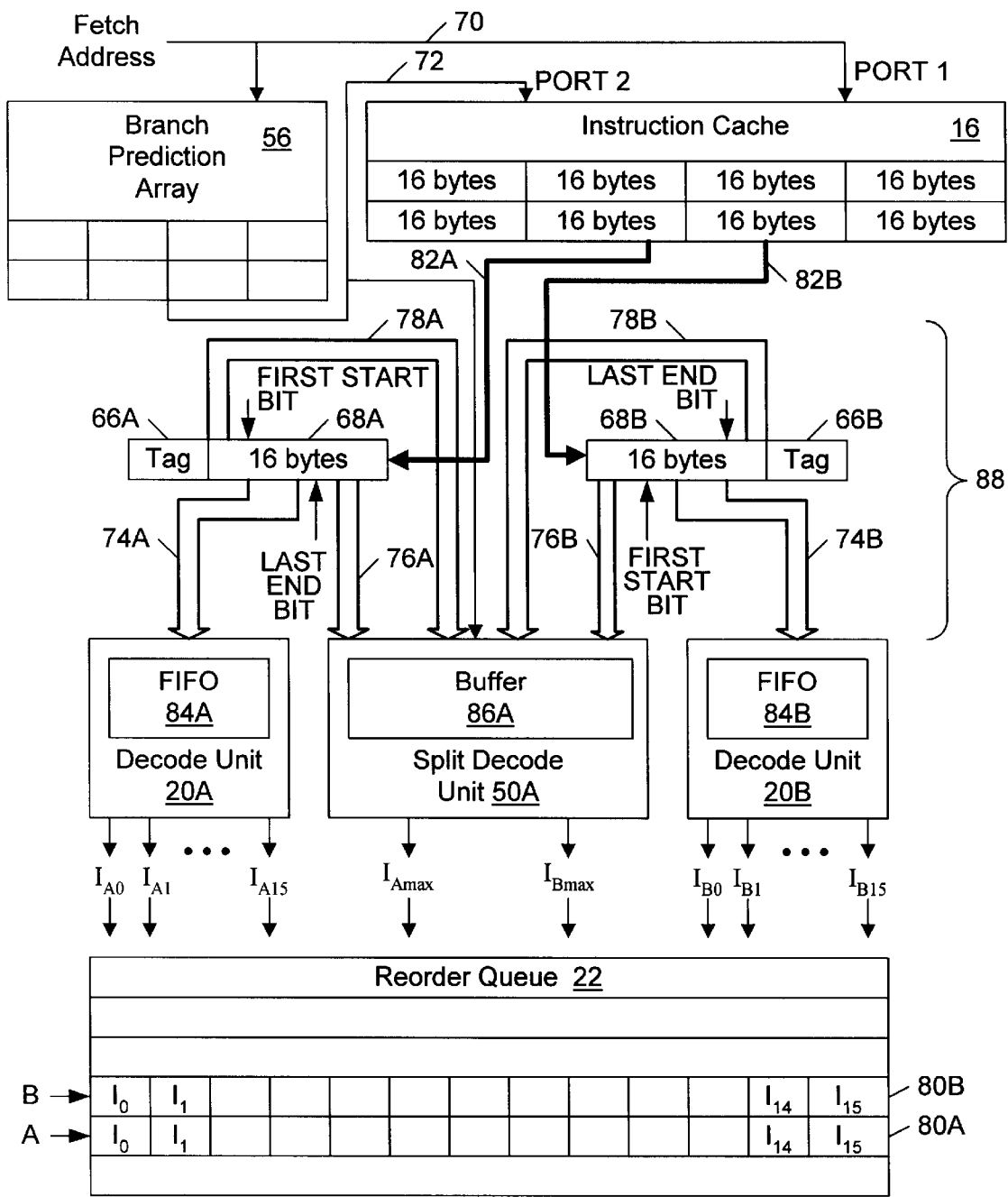
FIG. 2A is a block diagram showing more details of one embodiment of the decode units and reorder queue from the microprocessor of FIG. 1.

Turning now to FIG. 2A, more details regarding one embodiment of decode units 20A–B and reorder queue 22 are shown. In this embodiment, branch predication array 56 is coupled to instruction cache 16, which is in turn coupled to decode units 20A–B, and a split decode unit 50A by routing logic 88. Decode units 20A–B and split decode unit 50A are each coupled to reorder queue 22. Decode units 20A–B each comprise a FIFO memory 84A–B, respectively, while split decode unit 50A comprises a buffer 86A.

Branch prediction array 56 stores branch prediction information. For example, branch prediction array 56 may store predicted branch target addresses and predictions as to whether a particular branch instruction will be taken or not taken. In one embodiment, branch prediction array 56 may be configured to mirror instruction cache 16. For example, both instruction cache 16 and branch prediction array 56 may be configured to be 4-way set associative. In other embodiments, branch prediction array 56 may be direct mapped or fully associative.

Fetch addresses are conveyed to branch prediction array 56 and instruction cache 16 via a fetch address bus 70. Upon receiving a fetch address, branch prediction array 56 performs address or tag comparisons to determine whether or not a branch prediction is stored that corresponds to the cache line being fetched from instruction cache 16. If a prediction is stored, branch prediction array 56 routes the address of the predicted next cache line to instruction cache 16.

In one embodiment, instruction cache 16 has two read ports 82A and 82B. This allows instruction cache 16 to output cache lines corresponding to the original fetch address and the predicted next cache line address concurrently. In another embodiment, instruction cache 16 may have three read ports and branch prediction array may output the addresses of the next two predicted cache lines simultaneously.

When instruction cache 16 outputs a cache line 68A, it is accompanied by predecode information and a decode reorder queue tag 66A. Decode reorder queue tag 66A indicates which storage location in reorder queue 22 the cache line will be stored in after it is decoded. For each cache line (or portion thereof, depending upon the implementation), reorder queue 22 is configured to allocate a storage line.

Routing logic 88 is configured to receive the cache lines and route them to decode units 20A–B and split decode unit 50A according to the accompanying predecode information. As previously described, the predecode information associated with each instruction cache line indicates the first and last bytes of each instruction within the cache line. In one embodiment, routing logic 88 is configured to route all complete instructions to decode unit 20A. All instruction bytes that are part of incomplete instructions (e.g., instructions extending across cache line boundaries) are routed to split decode unit 50A.

One way to accomplish this sorting is to utilize the predecode bits accompanying each cache line. For example, routing logic 88 may route all instruction bytes before the first start bit (i.e., before the first start byte) and after the final end bit (i.e., after the last byte of the last full instruction within the cache line) to split decode unit 50A. Thus, routing logic 88 is configured to route complete instructions to decode unit 20A and partial instructions to split decode unit 50A.

Routing logic 88 may be configured to perform the same routing on cache lines received from the second read port 82B of instruction cache 16. Thus, complete instructions are routed to decode unit 20B, while partial or incomplete instruction bytes are routed to split decode unit 50A. In addition, routing logic 88 may be configured to route copies of the decode reorder queue tags 66A and 66B with each instruction or partial instruction to decode units 20A–B and split decode unit 50A.

Decoder units 20A–B and split decode unit 50A are configured to decode the instruction they receive independently and without regard to what order the instructions occur (relative to other instructions being decoded by the other decode units). Thus, decode units 20A–B and split decode unit 50A are each able to decode instructions out of order.

Within split decode unit 50A, buffer 86A is configured to receive and store partial instructions with their corresponding decode reorder queue tags. Split decoder 50A is also configured to receive the predicted cache line addresses from branch prediction array 56. Using this information, split decode unit 50A is configured to reassemble the partial instructions stored within buffer 86A.

As previously noted, each cache line output by instruction cache 16 is allocated a storage line (e.g., storage line 80A or 80B) within reorder queue 22. Each storage line comprises storage for sixteen decoded instructions. Since the maximum number of instructions within a single cache line is sixteen (assuming a minimum instruction length of one byte), all instructions decoded within a cache line may be stored within a single storage line. If the cache line has less than sixteen instructions, the remaining storage locations within the storage line are designated empty or are padded with NOP (no operation) instructions. In some embodiments, storage lines within reorder queue 22 may each have an additional storage location for storing the corresponding cache line's address information. The address information may be used by reorder buffer 26 and functional units 32A–C to track the EIP (instruction pointer) and resolve branch predictions.

In one embodiment, each decode unit 20A–B has outputs equaling the maximum possible number of instructions that may be decoded from a particular cache line (e.g., sixteen outputs). Reorder queue 22 stores each instruction in the storage line corresponding to the instruction's decode reorder queue tag and the storage location corresponding to the output upon which the instruction is conveyed. For example, the fifth instruction decoded from cache line 68A will be conveyed to reorder queue on line $I_{A4}$ and will be stored in location $I_4$ within storage line 80A. Assuming cache line 68A comprises five complete instructions and a sixth partial instruction beginning after the last end bit, locations $I_0$–$I_4$ in storage line 80A will be filled with instructions from decode unit 20A. Locations $I_5$–$I_{14}$ are left empty or filled with no-ops. Location $I_{15}$, however, is filled with the decoded partial instruction by split decode unit 50A once it has received the corresponding portion of the partial instruction from cache line 66B.

Exemplary Operation of One Embodiment

Figure 2B:
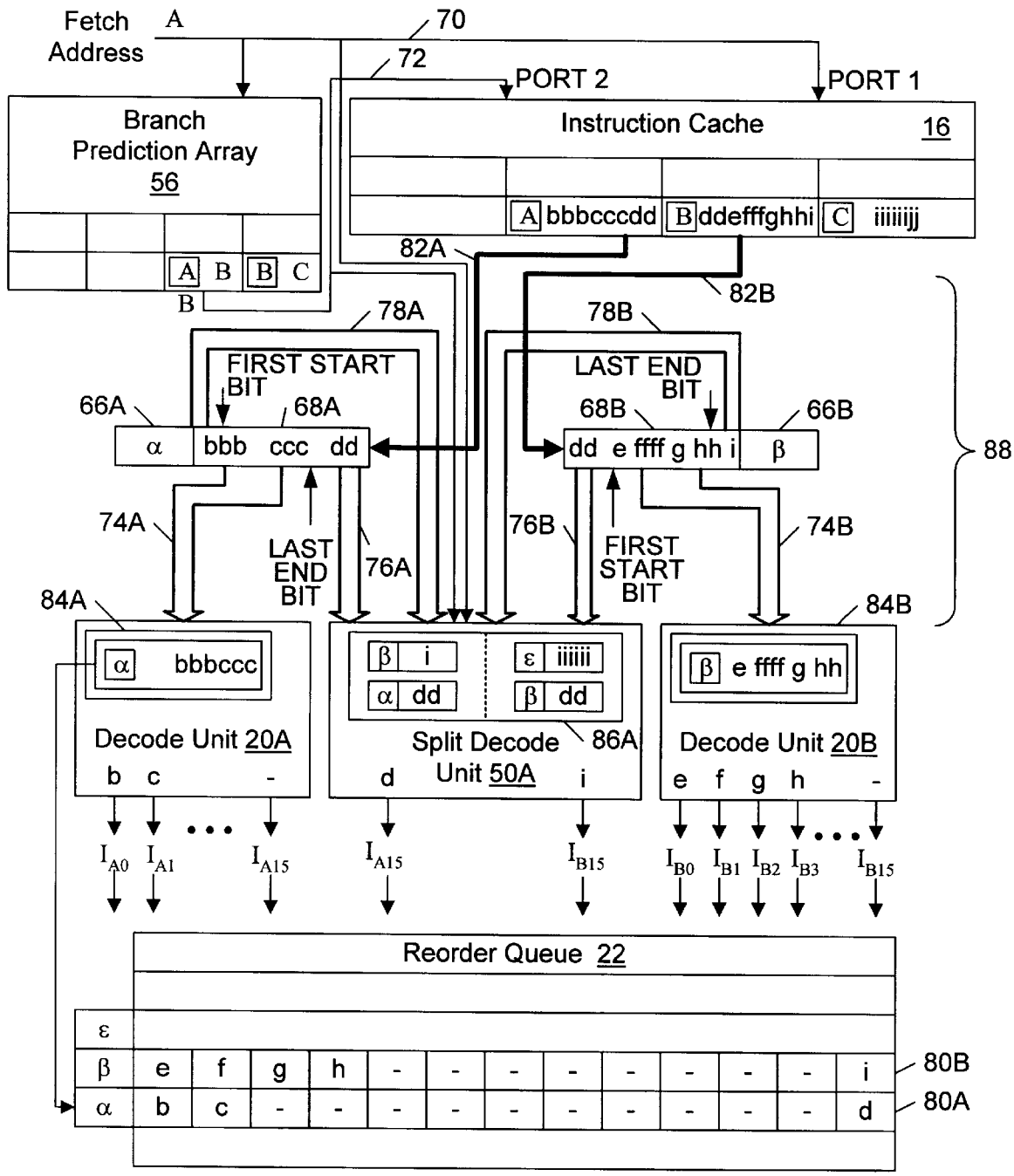
FIG. 2B is a block diagram showing one possible method for operating the decode units and reorder queue from FIG. 2A.

Turning now to FIG. 2B, details of one possible method for operating the microprocessor from FIG. 2A are shown. As the figure illustrates, a fetch address A is conveyed along fetch address bus 70 to branch prediction array 56, instruction cache 16, and split decode unit 50A. In response, instruction cache 16 outputs the cache line having an address tag matching A. This cache line is represented within routing logic 88 as block 68A. Reorder queue 22 allocates the next available storage line 80A to the cache line and provides a corresponding decode reorder queue tag α (see block 66A) that points to the allocated storage line.

Routing logic 88 routes all whole instructions within the cache line (i.e., instructions represented by "bbb" and "ccc") to decode unit 20A along with decode reorder queue tag α. FIFO 84A within decode unit 20A receives and stores the whole instructions until decoder 20A is ready to decode them. As the figure illustrates, decode unit 20A decodes instruction "bbb" as the first instruction in the cache line and outputs it though output $I_{A0}$ to reorder queue 22. Similarly, decode unit 20A decodes instruction "ccc" as the second instruction in the cache line and outputs it though output $I_{A1}$ to reorder queue 22. All other instruction outputs from decode unit 20A (i.e., outputs $I_{A2}$–$I_{A15}$) are zeroed out (represented by "–").

Reorder queue 22 receives the decoded instructions (represented by "b" and "c" in the figure) and stores them within the first two storage locations within storage line 80A, as designated by the decode reorder queue tag α accompanying the instructions from decode unit 20A.

In parallel with the operations described above, branch prediction array 56 outputs the address tag for the next predicted cache line. In the example shown, the next predicted cache line has an address tag B. This tag is conveyed to the second read port of instruction cache 16 via bus 72.

In one embodiment, reorder queue 22 monitors all address tags conveyed to both ports of instruction cache 16 and allocates storage lines (e.g., storage line 80B) and decode reorder queue tags accordingly. Split decode unit 50A may monitor the decode reorder queue tags allocated by reorder queue 22. This may enable split decode unit 50A to track the order in which the corresponding cache lines appear.

Instruction cache 16 responds to the address tag by outputting the corresponding cache line having an address tag B to routing logic 88. The cache line (represented as block 68B) is accompanied by is corresponding decode reorder queue tag β (represented by block 66B) from reorder queue 22.

Routing logic 88 performs a similar function upon cache line 68B as with cache line 68A. The complete or whole instructions (represented as "e", "ffff", "g", and "hh") are routed to decode unit 20B, along with decode reorder queue tag β. Partial instructions (in this example, "dd" and "i") are routed to split decode unit 50A, also with decode reorder queue tag β.

Decode unit 20B decodes the whole instructions and outputs them one per instruction output. As with decode unit 20A, any outputs not used may be zeroed out or may convey no-op instructions. When these decoded instructions are received by reorder queue 22, they are stored in storage locations (according to their output order) within storage line 80B, which corresponds to decode reorder queue tag β.

While decode units 20A and 20B are independently decoding their instructions, split decode unit 50A reassembles the instruction fragments it receives according to the decode reorder queue tag order it has established from the tags it has received from reorder queue 22 and branch prediction array 72. Once reassembled, the instructions are decoded and output to reorder queue 22 according to their decode reorder queue tags. Split decode unit 50A may be configured to output only the decode reorder queue tag corresponding to the first part of the instruction, thereby assuring the instruction will be stored in the final storage location within the storage line allocated to cache line from which the first instruction portion came. For example, instruction "dddd" is split between cache line 68A and 68B. When split decode unit 50A reassembles the instruction, it will be output with decode reorder queue tag α, thereby assuring that it will be stored in storage line 80A. The output or outputs of split decode unit may automatically be assigned to the last instruction storage location in each storage line.

Advantageously, decode units 20A–B and split decode unit 50A are able to decode instructions out of order. For example, decode unit 20B may complete decoding cache line 68B and begin decoding a second cache line before decoder 20A completes decoding cache line 68A. Furthermore, reorder queue 22 may output instructions in program order by selecting storage lines according to their address tags and by simply discarding or skipping over storage locations that are empty or have no-op instructions within them. Thus, out-of-order decoding may be possible for greater performance while still providing for in-order dependency checking (using the instructions as they are output from reorder queue 22).

Details of Reorder Queue

Figure 3:
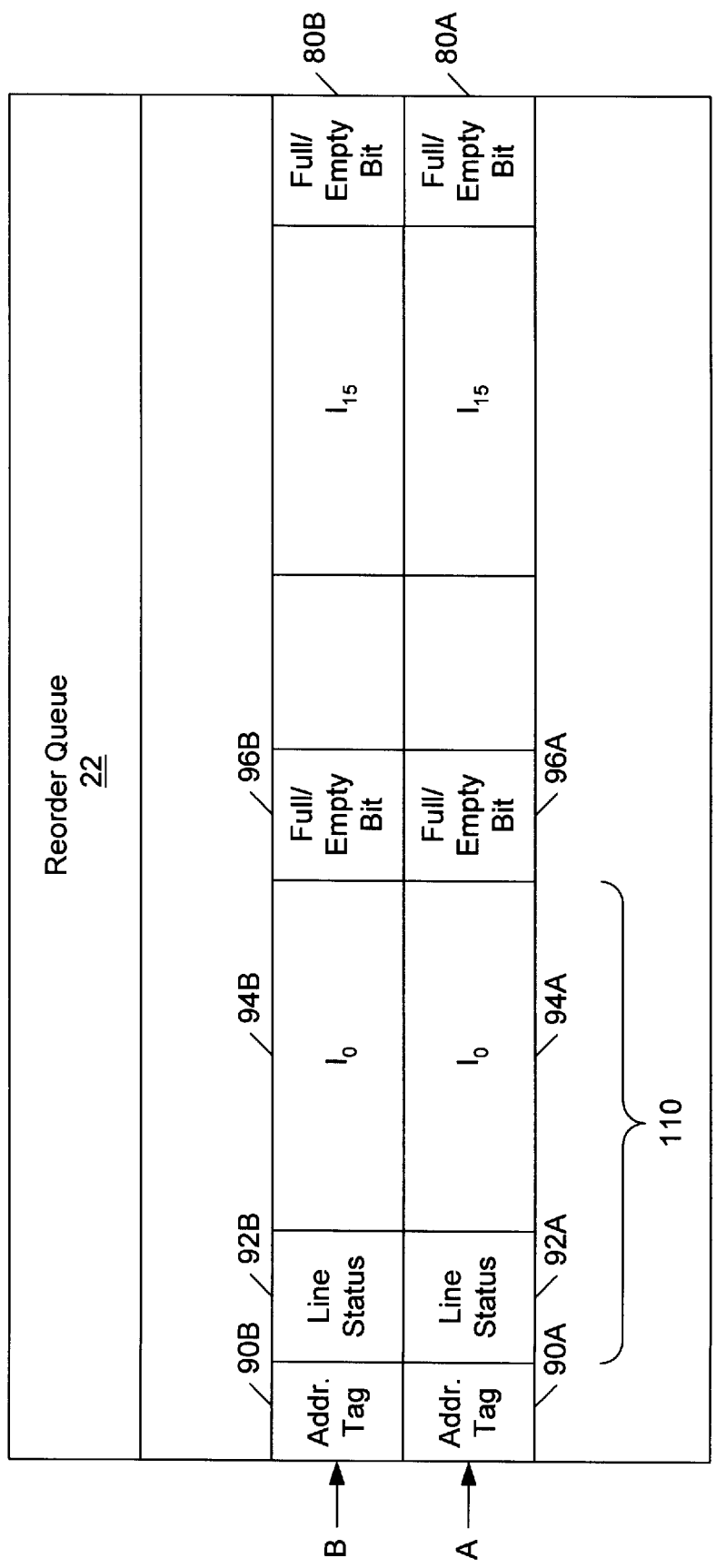
FIG. 3 is a block diagram showing more detail of one embodiment of the reorder queue from FIG. 2A.

Turning now to FIG. 3, more detail of one embodiment of reorder queue 22 is shown. In this embodiment, all storage lines are similarly configured. For example, storage line 80A comprises an address tag field 90A, a line status field 92A, and sixteen instruction storage locations (e.g., storage location 94A) each having a full/empty bit 96A. Address tag fields 90A–B store address information for instruction within the storage line. Line status fields 92A–B indicate whether the storage line is in use or available to be allocated to a new cache line. As previously noted, each instruction storage location 94A–B is configured to store a decoded instruction. The exact format of the decoded instruction may vary across different implementations. In one embodiment, the op-code and each operand (register or memory) have defined fixed-length fields. Full/empty bits 96A–B indicate whether the particular instruction storage location within the storage line is taken.

Once all the instructions within storage line 90A have been output, reorder queue 22 may be configured to clear the line's status bit 92A and all full/empty bits 96A in the line. Note, the fields described above for reorder queue 22 are merely exemplary and may be modified. For example, line status field 92A may be incorporated into address tag field 90A. To indicate that a particular line is available, reorder queue 22 would then set address tag field 90A to a predetermined value (e.g., all zeros), wherein the predetermined value corresponds to an address tag that reorder queue 22 will not normally receive from instruction cache 16 or branch prediction array 56.

Figure 4:
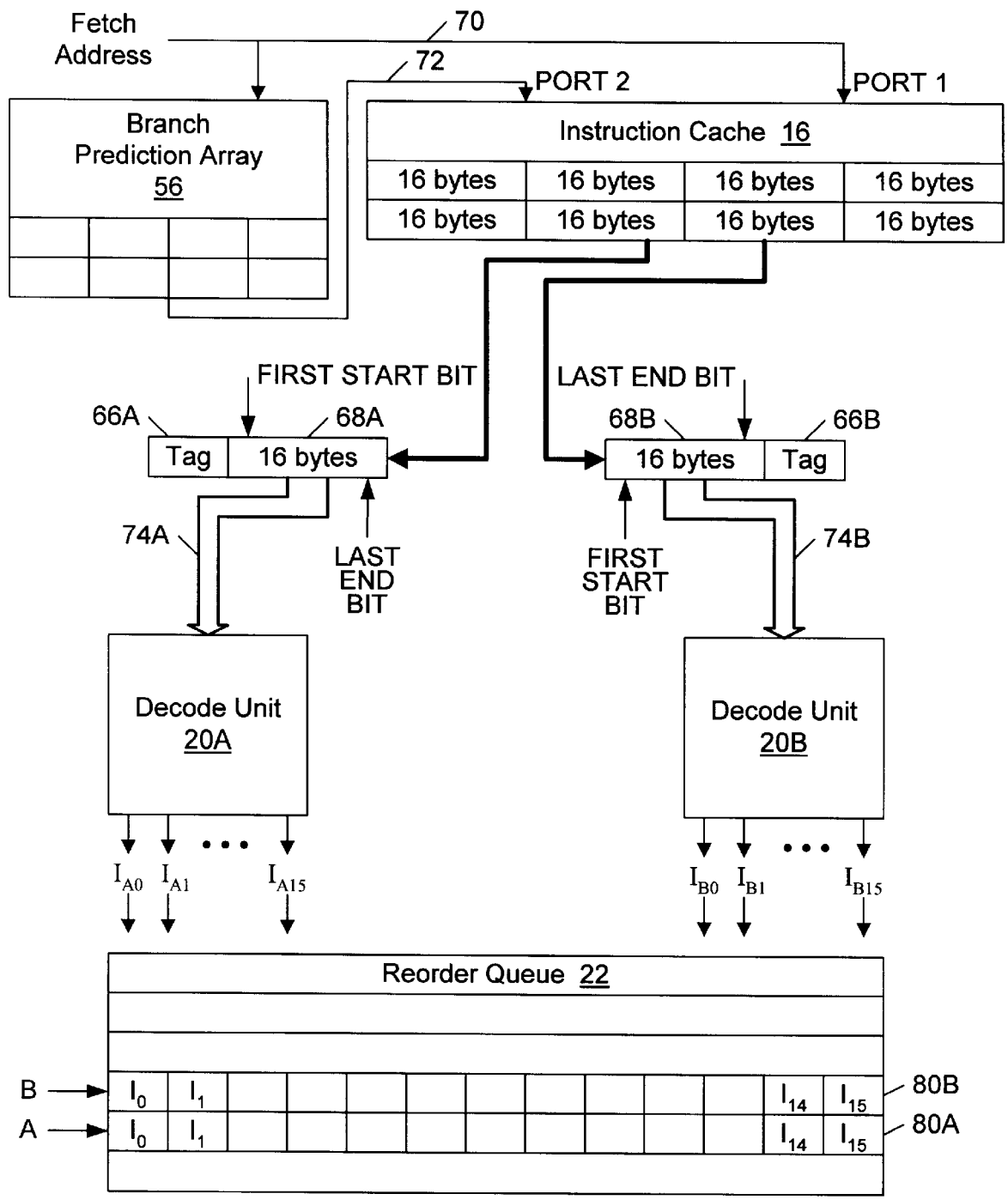
FIG. 4 is a block diagram showing another embodiment of the microprocessor from FIG. 1.

Turning now to FIG. 4, another embodiment of microprocessor 10 is shown. In this embodiment, predecode unit 12 is configured to pad instructions as they are stored in instruction cache 16 so that no instructions are split across cache line boundaries. In this case, routing logic 88 may be greatly simplified and split decode unit 50A may be eliminated. Alternatively, this embodiment of microprocessor 10 may be configured to execute fixed-length instructions (e.g., RISC instructions). By selecting cache line lengths that correspond to natural instruction boundaries, split decode unit 50A may be omitted. Decode units 20A–B and reorder queue 22 may basically operate in the same manner as previously discussed. Note however, that the number of instruction storage locations within each storage line in reorder queue 22 may vary across different implementations according to the maximum possible number of instruction within a single cache line.

In either embodiment, i.e., the embodiments described in either FIG. 3 or FIG. 4, the number of decode units 20A–20B may be increased. For example, in one embodiment microprocessor 10 may comprise three "whole instruction" decode units, each configured to independently and in parallel decode instructions from cache lines and route the corresponding decoded instructions to reorder queue 22.

Figure 5:
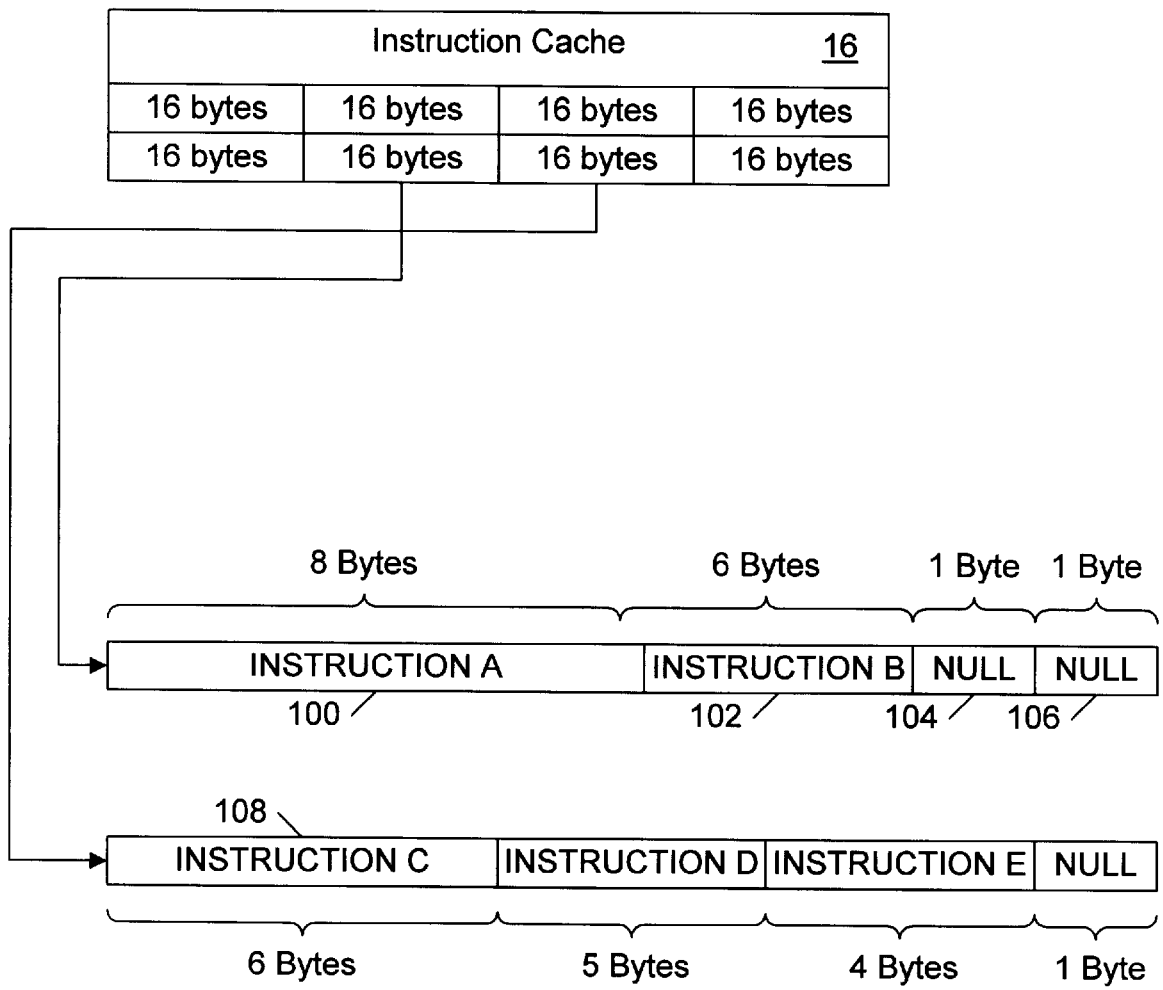
FIG. 5 is a block diagram illustrating one embodiment of a padding scheme for instructions.

Turning now to FIG. 5, an example of one padding scheme for instructions stored in instruction cache 16 is shown. The example assumes a sixteen byte cache line with variable length instructions. Instruction C 108 may be split between the cache lines, but instead NULL instructions 104 and 106 are padded to the cache line. NULL instructions are one byte instructions similar to NOP instructions except that they do not cause the program counter (PC) to advance. Note, in some embodiments NULL instructions may be used in place of NOP instructions within reorder queue 22 and decode units 20A–B. Further note, this padding scheme is optimized for variable-length instructions. If microprocessor 10 is configured to execute fixed-length RISC instructions, padding may be omitted if the cache line length is adjusted so that instructions do not extend across cache line boundaries.

Exemplary Computer System

Figure 6:
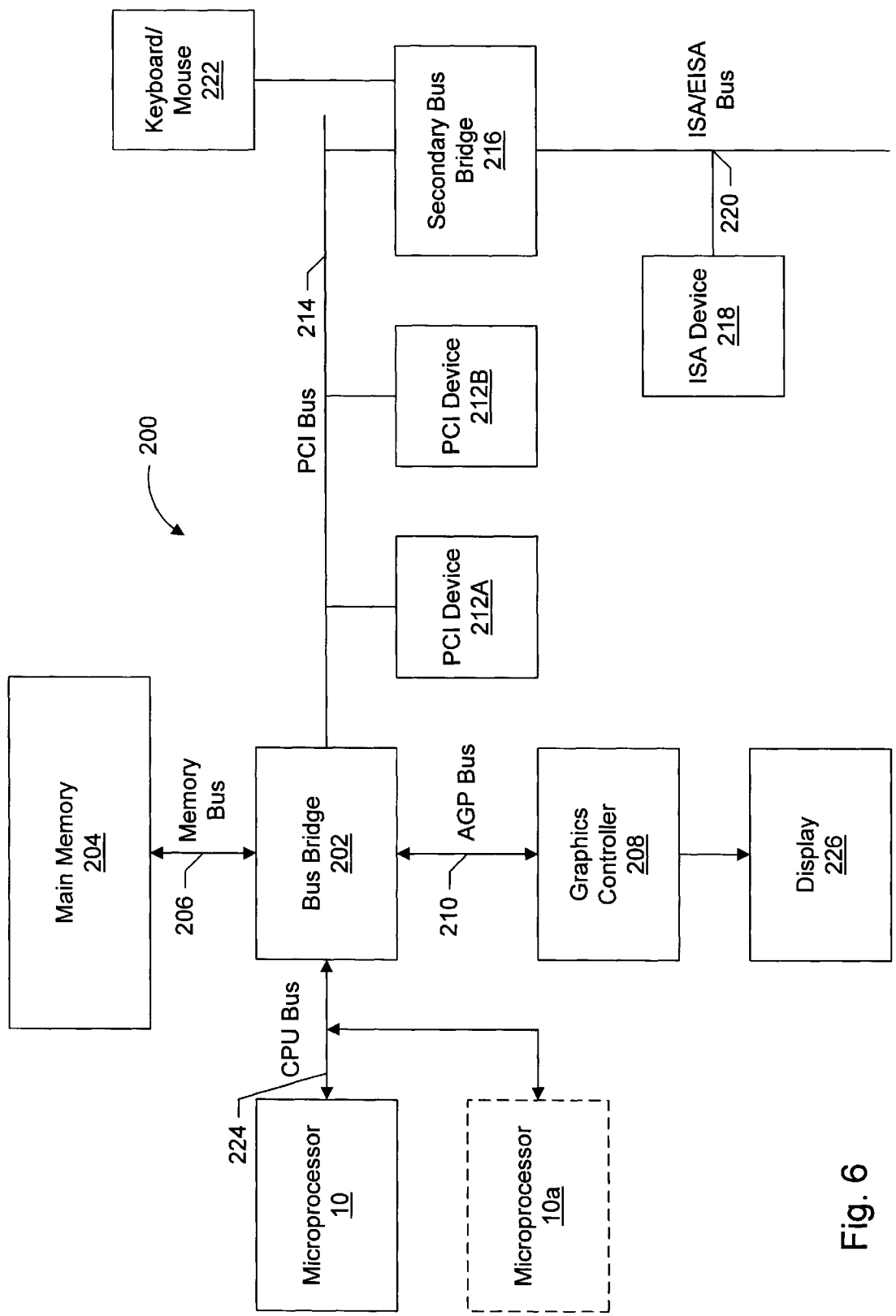
FIG. 6 is a block diagram of one embodiment of a computer system configured to use the microprocessor from FIG. 1.

Turning now to FIG. 6, a block diagram of one embodiment of a computer system 200 configured to use microprocessor 10 is disclosed. Computer system 200 is coupled to a variety of system components through a bus bridge 202 as shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports (e.g., a modem port for connecting a modem), as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

What is claimed is:

1. A microprocessor comprising:

an instruction cache configured to receive and store instruction bytes from a main memory, wherein said instruction cache is configured to output cache lines of sequential instruction bytes in response to receiving corresponding fetch addresses;

a first decoder coupled to said instruction cache, wherein said first decoder is configured to receive and independently decode a first portion of a first cache line;

a second decoder coupled to said instruction cache, wherein said second decoder is configured to receive and independently decode a second portion of said first cache line, wherein said second decoder is capable of decoding said second portion of said first cache line and beginning decoding of a portion of a second cache line before said first decoder completes decoding said first portion of said first cache line; and a decode reorder queue coupled to said first and second decoders, wherein said decode reorder queue comprises a plurality of storage locations, wherein each storage location is configured to store one decoded instruction, wherein said decode reorder queue is configured to receive instructions decoded from said cache lines by said first and second decoders, wherein said decode reorder queue is configured to store said decoded instructions in storage locations according to program order.

2. The microprocessor as recited in claim 1, further comprising dependency checking logic coupled to said decode reorder queue, wherein said dependency checking logic is configured to perform in-order dependency checking on decoded instructions output from said decode reorder queue.

3. The microprocessor as recited in claim 2, further comprising a reorder buffer coupled to said dependency checking logic, wherein said reorder buffer is configured to store said decoded instructions until said decoded instructions are ready for execution.

4. The microprocessor as recited in claim 2, wherein each storage location comprises a status bit, wherein said status bit is indicative of whether the storage location is storing a valid decoded instruction.

5. The microprocessor as recited in claim 2, wherein said storage locations are grouped into a plurality of storage lines, and wherein each storage line further comprises an address tag field configured to store address tags indicative of the program order of the storage lines.

6. The microprocessor as recited in claim 2, wherein said storage locations are grouped into a plurality of storage lines, and wherein the number of instruction storage locations within each storage line is equal to the maximum possible number of instructions in each cache line portion.

7. The microprocessor as recited in claim 2, wherein said reorder queue is capable of receiving instructions out of program order and is configured to output instructions in program order.

8. The microprocessor as recited in claim 1, wherein said first and second decoder each comprise a fixed number of instruction outputs, wherein said fixed number equals the maximum possible number of instructions within each cache line portion, and wherein each instruction output corresponds to a particular instruction position within said cache line portion.

9. The microprocessor as recited in claim 8, further comprising predecode logic coupled to said instruction cache, wherein said predecode logic is configured to generate start and end bits indicative of the first and last bytes of instructions, wherein said predecode bits are stored in said instruction cache and are conveyed with said instruction bytes to said decoders.

10. The microprocessor as recited in claim 9, wherein said decode reorder queue is configured to store each instruction received from said first and second decoders into storage locations that correspond to the particular instruction output upon which they are conveyed.

11. The microprocessor as recited in claim 10, further comprising routing logic and a third decoder coupled, wherein said routing logic is configured to receive the cache lines from said instruction cache and route whole instructions to one of said first or second decoders, and wherein said routing logic is configured to route partial instructions that extend across cache line portion boundaries to said third decoder, wherein said third decoder is configured to reassemble said partial instructions into whole instructions, and wherein said third decoder is configured to decode said whole instructions.

12. The microprocessor as recited in claim 11, wherein said storage locations are grouped into a plurality of storage lines, and wherein said third decoder is further configured to convey said decoded whole instructions to said decode reorder queue, and wherein said decode reorder queue is configured to store said decoded whole instructions in the final storage location of the corresponding storage line.

13. A method for operating a microprocessor comprising:
fetching a plurality of instruction bytes;
decoding the instructions contained within the plurality of instruction bytes out of program order, wherein the decoding is performed by:
using a first decoder to decode a first instruction contained within the plurality of instructions bytes,
using a second decoder to decode a second instruction contained within the plurality of instructions bytes, wherein the second instruction occurs after the first instruction in program order, and
using the second decoder to decode a third instruction contained within the plurality of instructions bytes, wherein the third instruction occurs after the first and second instructions in program order, wherein the second decoder is configured to complete decoding the second instruction and begin decoding the third instruction after the first decoder begins decoding the first instruction and before the first decoder completes decoding the first instruction;
reordering the decoded instructions to program order;
performing dependency checking on the decoded and reordered instructions;
issuing the instructions to reservation stations for eventual execution out of program order; and
executing the instructions out of program order.

14. The method as recited in claim 13, further comprising:
allocating storage locations within a decode reorder buffer for potential instructions within a first portion of the plurality of instruction bytes;
allocating storage locations within the decode reorder buffer for potential instructions within a second portion of the plurality of instruction bytes;
allocating storage locations within the decode reorder buffer for potential instructions within a third portion of the plurality of instruction bytes;
independently decoding the first portion of the plurality of instruction bytes using the first decoder; and
independently decoding the second portion of the plurality of instruction bytes using the second decoder
independently decoding the third portion of the plurality of instruction bytes using the second decoder, wherein the second and third portions occur after the first portion in program order, and wherein the second decoder is configured to complete decoding the second portion and begin decoding the third portion after the first decoder begins decoding the first portion and before the first decoder completes decoding the first portion.

15. The method as recited in claim 14, wherein said reordering further comprises: storing each decoded instruction within the corresponding allocated storage location within the decode reorder buffer.

16. The method as recited in claim 15, wherein said dependency checking is performed on the decoded instructions stored in program order in the decode reorder buffer.

17. The method as recited in claim 16, further comprising:
storing the results of the executed instructions in a future file/retire queue; and
retiring the instructions in order by committing the results to the architectural state of the microprocessor.

18. The method as recited in claim 14, further comprising:
grouping the plurality of instructions into cache line portions; and
routing selected instruction bytes to a third decoder, wherein the selected instruction bytes belong to instructions that extend beyond cache line portion boundaries, wherein the third decoder is configured reassemble and decode the selected instruction bytes.

19. A computer system comprising:
a first microprocessor;
a CPU bus coupled to said first microprocessor; and
a modem coupled to said CPU bus,
wherein said first microprocessor comprises:
an instruction cache configured to receive and store instruction bytes from a main memory, wherein said instruction cache is configured to output a cache line of sequential instruction bytes in response to receiving a corresponding fetch address;
a first decoder coupled to said instruction cache, wherein said first decoder is configured to receive and independently decode a first portion of a first cache line;
a second decoder coupled to said instruction cache, wherein said second decoder is configured to receive and independently decode a second portion of said first cache line, wherein said second decoder is capable of decoding said second portion of said first cache line and beginning decoding of a portion of a second cache line before said first decoder completes decoding said first portion of said first cache line;

a decode reorder buffer coupled to said first decoder and said second decoder, wherein said decode reorder buffer comprises a plurality of storage locations, wherein each storage location is configured to store one decoded instruction, wherein said decode reorder buffer is configured to receive instructions decoded from said cache line by said first decoder and said second decoder, wherein said decode reorder buffer is configured to store said decoded instructions in storage locations according to program order; and dependency checking logic coupled to said decode reorder buffer, wherein said dependency checking logic is configured to perform dependency checking on decoded instructions stored in program order in said decode reorder buffer, wherein said dependency checking logic is configured to issue said decoded instructions to a plurality of functional units for out-of-order execution.

20. The computer system as recited in claim 19, further comprising:

a second microprocessor coupled to said CPU bus, wherein said second processor also comprises:

an instruction cache configured to receive and store instruction bytes from a main memory, wherein said second instruction cache is configured to output a cache line of sequential instruction bytes in response to receiving a corresponding fetch address;

a first decoder coupled to said instruction cache, wherein said first decoder is configured to receive and independently decode a first portion of said cache line;

a second decoder coupled to said instruction cache, wherein said second decoder is configured to receive and independently decode a second portion of said cache line;

a decode reorder buffer coupled to said first decoder and said second decoder, wherein said decode reorder buffer comprises a plurality of storage locations, wherein each storage location is configured to store one decoded instruction, wherein said decode reorder buffer is configured to receive instructions decoded from said cache line by said first decoder and said second decoder, wherein said decode reorder buffer is configured to store said decoded instructions in storage locations according to program order; and dependency checking logic coupled to said decode reorder buffer, wherein said dependency checking logic is configured to perform dependency checking on decoded instructions stored in program order in said decode reorder buffer, wherein said dependency checking logic is configured to issue said decoded instructions to a plurality of functional units for out-of-order execution.

21. A microprocessor comprising:

an instruction cache configured to receive and store instruction bytes from a main memory, wherein said instruction cache is configured to output cache lines of sequential instruction bytes in response to receiving corresponding fetch addresses;

a first decoder coupled to said instruction cache, wherein said first decoder is configured to receive and independently decode a first portion of a first cache line;

a second decoder coupled to said instruction cache, wherein said second decoder is configured to receive and independently decode a second portion of said first cache line, wherein said second decoder is capable of decoding said second portion of said first cache line and beginning decoding of a portion of a second cache line before said first decoder completes decoding said first portion of said cache line;

a third decoder;

routing logic configured to receive the cache lines from the instruction cache and route whole instructions to one of said first or second decoders and route partial instructions that extend across cache line portion boundaries to the third decoder, wherein the third decoder is configured to reassemble the partial instructions into whole instructions, and wherein the third decoder is configured to decode the reassembled whole instructions; and a decode reorder queue coupled to said first, second, and third decoders, wherein said decode reorder queue comprises a plurality of storage locations, wherein each storage location is configured to store one decoded instruction, wherein said decode reorder queue is configured to receive instructions decoded from said cache lines by said first and second decoders, wherein said decode reorder queue is configured to store said decoded instructions in storage locations according to program order.

22. The microprocessor as recited in claim 21, wherein said first and second decoder each comprise a fixed number of instruction outputs, wherein said fixed number equals the maximum possible number of instructions within each cache line portion, and wherein each instruction output corresponds to a particular instruction position within said cache line portion.

23. The microprocessor as recited in claim 21, further comprising predecode logic coupled to said instruction cache, wherein said predecode logic is configured to generate one or more predecode bits for each instruction byte, wherein the predecode bits are indicative of whether the corresponding instruction bytes start new instructions, wherein the predecode bits are conveyed with said instruction bytes to said decoders.

24. The microprocessor as recited in claim 21, wherein said decode reorder queue is configured to store each instruction received from said first and second decoders into storage locations that correspond to the particular instruction output upon which they are conveyed.

25. The microprocessor as recited in claim 21, wherein said storage locations are grouped into a plurality of storage lines, and wherein said third decoder is further configured to convey said decoded whole instructions to said decode reorder queue, and wherein said decode reorder queue is configured to store said decoded whole instructions in the final storage location of the corresponding storage line.

* * * * *